United States Patent [19]
Schroeder et al.

[11] Patent Number: 4,963,380
[45] Date of Patent: *Oct. 16, 1990

[54] BEVERAGES CONTAINING FISH OILS STABILIZED WITH FRUCTOSE

[75] Inventors: Lisa R. Schroeder, Brooklyn Park; Dorothy J. Muffett, Bloomington, both of Minn.

[73] Assignee: General Mills, Inc., Minneapolis, Minn.

[*] Notice: The portion of the term of this patent subsequent to Apr. 3, 2007 has been disclaimed.

[21] Appl. No.: 314,186

[22] Filed: Feb. 22, 1989

Related U.S. Application Data

[63] Continuation-in-part of Ser. No. 126,327, Nov. 30, 1987, abandoned.

[51] Int. Cl.$^5$ ............................................. H23D 5/00
[52] U.S. Cl. ................................ 426/330.3; 426/330; 426/330.6; 426/541; 426/544; 426/602; 426/613
[58] Field of Search ............... 426/601, 602, 590, 613, 426/658, 321, 330, 330.3, 330.6, 544, 541

[56] References Cited

U.S. PATENT DOCUMENTS

| 2,198,212 | 12/1939 | Musher | 426/546 |
| 4,332,824 | 6/1982 | Kahn et al. | 426/590 X |
| 4,363,823 | 12/1982 | Kimura et al. | 426/613 X |
| 4,461,777 | 7/1984 | Murase et al. | 426/602 X |
| 4,637,937 | 1/1987 | Terada et al. | 426/602 X |

Primary Examiner—Donald E. Czaja
Assistant Examiner—Evan Federman
Attorney, Agent, or Firm—Dorsey & Whitney

[57] ABSTRACT

Disclosed are food products, especially stable beverage emulsions which contain nonhydrogenated fish oil yet which exhibit enhanced stability of the fish oil against flavor and aroma degradation. The improved food products are stabilized by the incorporation of the food product such that the weight ratio of fructose to fish oil is at least about 0.01:1. Surprisingly, incorporation of modest amounts of fructose in food products within the indicated minimum provides a stabilizing effect of the highly unstable fish oil. The present invention finds particular suitability for use in connection with fish oils rich in omega-3 fatty acids.

12 Claims, No Drawings

BEVERAGES CONTAINING FISH OILS STABILIZED WITH FRUCTOSE

CROSS-REFERENCE TO RELATED APPLICATION

This application is a continuation-in-part application of copending application Ser. No. 126,327, filed Nov. 30, 1987 now abandoned.

BACKGROUND OF THE INVENTION

1. Technical Field

The present invention relates to food products. More particularly, the present invention relates to beverages containing fish oils characterized by better flavor and enhanced stability.

2. Background Art

A great deal of attention has recently been focused on the various health benefits apparently associated with consumption of fish oil. Health benefits appear to be related to the presence of high levels of the n-3 family of polyunsaturated fatty acids. Oils containing such materials, such as fish oils, are referred to as "omega-3" oils and desirably contain high levels of n-3 fatty acids, especially eicosapentaenoic acid ("EPA") and docosahexaenoic acid ("DHA"). Such fatty acids are called "omega-3" since the first double bond occurs in the third carbon bond counting from the end or omega position of the fatty acid.

Notwithstanding the present interest in the health benefits of fish oil consumption, nonhydrogenated fish oil generally to date has not been widely used per se or as an ingredient in processed food products for use by humans due to notorious and severe problems in odor and flavor. However, gelatin capsules containing fish oil are available. Additionally, salmon oil has been added to canned salmon. Also, certain canned meat products have been marketed in Japan which have had refined fish oil added as a fortifier.

Hydrogenated fish oils are much more stable due to the decrease in the degree of polyunsaturation and are widely used in Europe for margarine. Hydrogenated fish oils have also been used in Scandinavian countries in other consumer products, e.g., finished cakes. Hydrogenation is also effective in reducing odor and flavor after deodorization. However, hydrogenation by decreasing polyunsaturation including the n-3 fatty acid component correspondingly decreases the health value of fish oil. Accordingly, it would be desirable to realize a nonhydrogenated fish oil or food products containing such nonhydrogenated fish oils, but nonetheless of increased stability.

The principal approach taken in the art to utilize nonhydrogenated fish oil has been to employ fish oils of enhanced stability. Two broad approaches have been taken in the art to realize nonhydrogenated fish oils of enhanced stability. The first approach involves giving attention to the processing of the oil to achieve a cleaner, finished oil product. Particular attention has been given to the deodorization step in order to realize cleaner finished fish oil products.

In the second approach, the art has attempted to find adjuvants which can be added to finished fish oil to provide desired additional stability. For example, while the phenomenon of fish oil degradation is not completely understood, it is known, however, that oxidative rancidification is a contributing factor. Addition of known antioxidants, singly as well as commercial mixtures, some allegedly synergistic does result in some increase in stability. However, the instability of nonhydrogenated fish oils is so great, that even addition of such materials at maximum legally permitted levels provide only modest increases in stability.

Given the severe difficulties in realizing a suitable fish oil ingredient, it is understandable that comparatively little developmental effort has been made to formulate processed food products containing fish oil.

The prior art also includes U.S. Pat. No. 4,357,362 (issued Nov. 2, 1982 to David Barker). This patent discloses a pet food composition including fish material of reduced fishy odor by subjecting the composition in a sealed container, to sterilizing heat in the presence of a reducing agent. However, several disadvantages exist with this approach. First, the primary advantage is a fish odor reduction which is not necessarily directly related to the problems of fish oil flavor degradation. Second, a severe heat treatment in a sealed container is required in order to achieve the reduction in odor. It is undesirable for many foods to be subjected to such severe heat treatment. Third, fish flesh or fish proteinaceous material, an essential ingredient of these pet foods, is known to have a material effect on stability. However, many food products cannot contain fish flesh, e.g., mayonnaise, yet could beneficially include fish oil were oil stability nonetheless obtained. Also, the product is less susceptible to oxidative rancidity since it is sealed. Finally, a wide variety of organic and inorganic reducing agents are taught as useful although reducing sugars are preferred.

Given the state of the art with regard to fish oil stabilization, there is a continuing need for the development of new and improved processed food products containing fish oil of improved stability.

Accordingly, it is an object of the present invention to provide food products containing nonhydrogenated fish oils which nonetheless exhibit improved stability against degradation in both flavor and odor.

It is another object of the present invention to provide food products of enhanced stability which do not require heat sterilization.

Another object of the present invention is to provide food products containing fish oil which do not require fish meat.

Still another object of the present invention is to provide food products containing fish oil of enhanced stability against flavor degradation.

It has been surprisingly discovered that the above objectives can be realized and superior beverages containing fish oils can be prepared by incorporation of modest amounts of fructose. Surprisingly, fructose appears to be unexpectedly superior in providing the desired stabilization benefits.

SUMMARY OF THE INVENTION

The present invention relates to beverages containing fish oils of enhanced stability. In addition to common beverage ingredients, the present beverages comprise finished fish oils stabilized with minor amounts of fructose.

DETAILED DESCRIPTION OF THE INVENTION

The present invention resides in nutritional beverages containing fish oil but which are substantially free of fish flesh. Nonetheless, the present beverages are characterized by enhanced oil stability by virtue of the incorporation of minor amounts of fructose.

Throughout the specification and claims, percentages are by weight and temperatures in degrees Fahrenheit, unless otherwise indicated.

A first major essential beverage constituent is the flavor characterizing ingredient(s) comprising a moisture or water component and a solid flavor component. Exemplary moisture containing flavor characterizing ingredients can include fruit juices, milk and aqueous extracts of such materials as coffee, tea and cola. Especially preferred for use herein are fruit juices. Exemplary fruit juices are those prepared from fruits such as citrus fruits including orange, grapefruit, lemon, nectarine, lime and mixtures thereof as well as grape, strawberry, pineapple, apple, raspberry, tomato, blueberry, cherry, pear and mixtures thereof. Highly preferred flavor ingredients include orange, grape, cherry and apple juices. The moisture containing flavor ingredient can comprise from about 10% to 92%, preferably 25% to 70% of the beverage. Such ingredients are generally 85% to 95% moisture in the form of water. The solid materials can comprise sugars, pulp or fibers, and flavors/volatiles. Of course, the flavor characterizing ingredient can be reconstituted using water and concentrated components, e.g., water and 3:1 fruit juice concentrate. Artificial drinks can also be prepared using combinations of water, flavor, sugars, pulp, etc. approximating the composition fruit juices, for example.

Still another essential ingredient of the beverage is a fish oil. The present beverage is a convenient vehicle for delivery for consumption of fish oil to obtain the desirable special nutritional advantages provided by fish oil. Desirably, the fish oils comprise from about 1% to 30%, preferably about 3% to 15% of the beverage.

Fish oils are staples of commerce and their general processing is well known (see, for example, Fish Oils: Their Chemistry, Technology, Stability, Nutritional Propertie, and Uses, ed. by M. E. Stansby, The Avi Publishing Company, Inc. 1967 and which is incorporated by reference). Especially useful for their therapeutic value herein are oils having a total n-3 fatty acid content of greater than about 20% such as are derived from menhaden oil, herring, capelin, anchovy, cod liver, salmon oil, sardine oil and mixtures thereof. Especially preferred for use herein is menhaden oil due to such supply considerations as cost and availability as well as its nutritional quality as being high in omega-3 fats. The fish oils can be conventionally processed, e.g., refined and deodorized, to provide what is referred to in the art as a "finished" oil. Unlike vegetable oils, however, fish oils typically do not require degumming. Also, conventional hydrogenation of the fish oil such as is done to make the oil suitable for use for the preparation of margarine is to be strictly avoided.

Preferably, the fish oils useful herein are processed according to the methods described in "Physical Process for Simultaneous Deodorization and Cholesterol Reduction of Fats and Oils", U.S. Pat. No. 4,804,555 issued Feb. 14, 1989 to Marschner et al.). The process there disclosed involves a process involving deaerating fish oil, mixing the oil with steam, heating, flash vaporization, thin film stripping with counter current steam (all steps being performed under vacuum). The finished fish oil prepared according to this method is additionally characterized both by reduced cholesterol (generally at cholesterol levels of less than about 400 mg/g, preferably less than about 250 mg/g) and enhanced stability by enhanced initial quality.

The present invention resides in part in the surprising discovery that beverage compositions can be prepared that include modest levels of nonhydrogenated, refined, deodorized and stabilized fish oil, so long as the beverage composition also meets both of two conditions: first, the beverage should include fructose within specified levels; and second, that the fish oil also includes the maximum permitted levels of selected antioxidants. The beverages essentially comprise about 0.1% to 30% fructose. Better results are obtained when fructose comprises about 3% to 15% of the beverage. For best results in terms of balancing the stability benefits provided by fructose while avoiding excessive sweetness, when not using an anti-sweetener, the fructose comprises about 5% to 8% of the beverage.

Insufficient fructose can result in rapid deterioration of quality of the food product. As the oil degrades, the resultant fishy flavor and aroma increases rendering the food product increasingly unpalatable. Excessive fructose levels can result in products characterized by undesirable sweetness without obtaining proportional increases in oil stability, if any. Better results in terms of obtaining oil stabilization benefits are obtained when the beverages are characterized not only by a concentration range for fructose but also by a fructose to oil in a minimum ratio of fructose of at least 10:100. Best results are obtained when the beverages contain fructose to oil in a minimum ratio of at least 20:100.

The fructose can be provided from both relatively pure and less pure sources. While pure crystalline fructose of various types and sources are commercially available, fructose in the form of high fructose corn syrup is practical from both a source availability and cost standpoint. Thus, in certain embodiments, high fructose corn syrup functions not only to provide the essential fructose fish oil stabilizer, but also functions as a sweetener. Less preferred but nonetheless useful herein are less pure sources of fructose such as other, lower fructose corn syrups, e.g., corn syrup, honey, maple syrup solids, fruit juice solids and the like.

Surprisingly, only fructose has been found to provide the high stabilization benefits of the present invention at the concentrations taught as essential herein and no satisfactory explanation can be set forward as to why fructose provides such unexpected results. Other reducing agents, whether organic or inorganic have not been found to provide the combined advantages of fructose of stabilization at relatively low levels and without cloying sweetness. Glucose, a closely related sugar, has been found to exhibit some fish oil stabilization activity. However, relative to fructose at the same levels, it is much less effective. Xylose has also been found to have some fish oil stabilization activity, but due to its cost, commercial availability and low benefit activity level is not a good substitute for fructose.

In certain instances during development of the present invention, sucrose has ostensibly been shown to give some apparent fish oil stabilization benefits. Upon analysis, however, it is speculated that the appearance of benefits by sucrose derive in fact from fructose resulting from spontaneous hydrolysis of sucrose into glucose and fructose or inversion. Thus sucrose per se is not believed to provide fish oil stabilization but, as surprisingly discovered, only by fructose.

The present beverages are in the form of oil-in-water stable emulsions. The term "stable" is meant to refer to those compositions which exist in emulsion form for extended times rather than quickly breaking down into non-intermixed water and oil phases. Stable emulsions are generally characterized by the presence of an emulsifier. The present invention beverages thus essentially comprise a small but effective amount of a food grade emulsifier to form a stable emulsion. Good results are obtained when the emulsifier is present in the beverages at concentrations ranging from about 0.1% to 0.5%.

Food grade emulsifiers are well known and the skilled artisan will have no difficulty in selecting particular materials for use herein as an emulsifier. Any one of a number of emulsifiers may be employed including but not limited to: hydroxylated lecithin, mono-, di-, or polyglycerides of fatty acids, such as monostearin and monopalmitin; polyoxyethylene ethers of fatty esters of polyhydric alcohols, such as the polyoxyethylene ethers of sorbitan monostearate (polysorbate 60 or 80) or the polyoxyethylene ethers of sorbitan distearate; fatty esters of polyhydric alcohols such as sorbitan monostearate; mono- and di-esters of glycols such as propylene glycol monostearate, and propylene glycol monopalmitate, succinoylated monoglycerides; sodium or calcium stearoyl-2-lactylate; and the esters of carboxylic acids such as lactic, citric, and tartaric acids with the mono- and diglycerides of fatty acids such as glycerol lactopalmitate and glycerol lactostearate. The fatty acids employed in the preparation of the emulsifiers include those derived from beef, tallow, and coconut, cottonseed, palm, peanut, soybean and marine oils. Many blends of emulsifiers are commercially used and readily available in accordance with known techniques. For example, it may be desirable to provide a controlled hydrophile-lipophile balance (HLB) as with a lipophilic emulsifier such as glyceryl monostearate or sorbitan monostearate with a hydrophilic material, such as polysorbate 80, while in other formulations, it has been found desirable to simply employ a purified mixture of mono- and diglycerides, i.e., a mixture of glyceryl monostearate and glyceryl distearate. Other emulsifiers can be found in Food Chemicals Codex, 2nd Edition, National Academy of Science, Washington, D.C. 1977 and the supplements thereto under "Emulsifiers, Whipped, and Foaming Agents," page 103.

In the preferred embodiments the oil component comprises a blend of fish oil and vegetable oil(s) also referred to in the art as an edible fatty triglyceride. In the less preferred embodiments, the oil component is supplied entirely by fish oil. If present, the vegetable oil can comprise from about 0.1% to 30% of the beverage.

Suitable fatty triglycerides can be either fats or oils. Fats useful herein should have melting points less than mouth temperatures, i.e., less than about 98° F. (37° C.). Any fatty triglyceride oil can be used, however, including even winterized oils. Of course, mixtures of fats and oils are contemplated for use herein.

Suitable fats and oils should be bland in taste, i.e., deodorized. Preferred triglyceride oils are additionally light in color, i.e., having a Gardener color scale value of less than four. For those embodiments to be statically frozen by consumer at-home preparation, the present oils preferably are winterized. Winterization is the common oil process whereby higher melting fractions are removed from edible oils to avoid clouding at refrigeration temperatures.

The present edible fatty triglyceride fats and oils can be derived from any of the naturally occurring liquid glyceridic oils such as soybean oil, cottonseed oil, peanut oil, sesame seed oil, and sunflower seed oil. Also suitable are liquid oil fractions obtained from palm oil, tallow, as for example, by graining or directed interesterification, followed by separation of the oil. Other suitable edible oil materials and methods of edible oil preparation are described in detail in Bailey "Industrial Oil and Fat Products", (3rd Ed. 1964) which is incorporated herein by reference. Preferred materials are selected from the group consisting of sunflower oil, soybean oil, safflower and mixtures thereof. Sunflower oil is the fatty triglyceride of choice, particularly partially hardened coconut oil (e.g., 76° F. (24° C.) coconut oil, i.e., coconut oil which has been partially hydrogenated so as to have a melting point of about 76° F.).

In certain embodiments the beverages can comprise a second sweetener, especially nutritive carbohydrate sweetening agents, in addition to fructose. If present, the second nutritive carbohydrate sweetening agents in combination with the fructose can comprise from as little as 0.1% up to about 40% of the beverage. Typically, the beverage will contain sufficient amounts of sweeteners to provide an agreeable taste. While any common nutritive carbohydrate sweetener can be employed, generally sucrose and/or high fructose corn syrup are employed due to their cost, availability and sweetness. Of course, high potency sweeteners such as saccharin, cyclomates, aspartame and mixtures thereof can be used in full or partial substitution for the second nutritive carbohydrate sweetener(s) but at reduced concentrations.

Still another higher preferred optional ingredient is a thickener or stabilizer intended to increase beverage body or viscosity. If present, such thickening or stabilizing ingredients can comprise about 0.1% to 10.0% of the beverage.

Useful materials for thickeners and stabilizers are well known and one skilled in the processed foods art will have no problem selecting particular materials for use. Especially useful herein are hydrocolloids such as edible polysaccharide gums.

The physical and chemical properties of edible polysaccharide gums are well known in the food art and selection of specific acid-stable gums will pose no problem to the skilled artisan (see, for example, "Gum Technology in the Food Industry," M. Glicksman, Academic Press, New York, 1969; "Food Colloids," ed. by H. D. Graham, Avi Publishing Co., Westport, Conn., 1977; and "Industrial Gums," R. L. Whistler 2nd ed., Academic Press, New York, 1973; each of which is incorporated herein by reference). Preferred gums for use herein are selected from the group consisting of guar gum, locust bean gum, xanthan gum and mixtures thereof. Best results in terms of mouthfeel and aeration stability are realized when the polysaccharide gum is a mixture of xanthan, locust bean and guar gums. Exemplary gum mixture of this type is sold by Merck & Co. under the name Kelco GFS. Xanthan is the gum of choice.

The polysaccharide gums are essentially present in the beverage compositions at from about 0.05% to 3.0%, preferably at from about 0.1% to 0.5%. Best results are obtained when the gums are present at from about 0.2% to 0.3%.

Particular gum utilization levels will depend upon the total moisture in the present compositions, the amount and type of fruit juice used, the particular gum(s) employed and the organoleptic properties desired in the present beverage compositions. Generally, however, higher gum utilization levels will be employed with higher compositions moisture content and lower oil levels.

The beverages can optionally additionally comprise about 0.1% to 5% of an acidifying agent, preferably about 0.25% to 1.0% of the beverage. Such supplemental acidulants can include citric, fumeric, malic acids, tartaric, adipic and mixtures thereof. The present beverages can also contain minor, but effective amounts of common beverage ingredients including flavorings including both concentrated natural and artificial flavorings, colorants, preservatives, vitamins and/or mineral supplements. Desirably, all the present food products and emulsions are free of any fish flesh. After conventional blending, the present beverages with fish oils stabilized with fructose are desirably packed in containers and flushed with an inert gas prior to sealing.

It is important in the provision of beverage compositions or organoleptically acceptable sweetness that the bodying agent be bland and provide minimal sweetness. Suitable bodying agents thus include low D.E. malto dextrins, polydextrose and mixtures thereof. By low D.E. is meant a malto dextrin with a D.E. of less than about 20. Low D.E. malto dextrins are commercially available from many suppliers and the skilled artisan will have no difficulty in selecting suitable malto dextrins for use herein. Generally, however, malto dextrins can be obtained by dextrinization of starch, particularly corn starch. Enzymatic hydrolysis, optionally under acidic conditions, of the starch can be used. The conditions are so mild that negligible repolymerization occurs. This is in contrast to dextrins which typically are made from starch by hydrolysis and repolymerization by using high temperature and pressure by dry heating or roasting of starches (pyro-dextrins). Low D.E. malto dextrin is the preferred material for use as the bodying agent herein.

Of course, the present food compositions will essentially include conventional oil stabilizing materials at their maximum permitted levels (e.g., 200 ppm of total oil) such as antioxidants, TBHQ, (tertiary Butylhydroquinone) BHA (Butylated Hydroxyamisole) or BHT (Butylated Hydroxytoluene). Not all food approved antioxidants have been shown to help. For example, the use of lecithin has been shown to actually aggravate development of fishy flavors.

In another aspect, the present invention resides in part in the discovery that a specific combination of antioxidants, namely, the combination of TBHQ and vitamin E, has unexpectedly been found to be superior than other antioxidants generally considered to be equivalent or substitutes. Thus, even more preferred beverage products further include 1 to 2000 ppm tocopherol in addition to the antioxidant(s) especially when TBHQ is the principle or sole antioxidant. Still more preferred products include 10 to 150 ppm (based on total oil) of a chelating agent desirably selected from the group consisting of citric acid, phytic acid, ethylene diamine tetra acetate and mixtures thereof. The food products can also beneficially include about 0.1% to 3% of an oil soluble flavor masking agent based on the weight of the fish oil. Especially useful herein as masking flavor agents are citrus oils such as lemon oil.

Still other useful food products are described in detail in our co-pending application entitled Food Products Containing Fish Oil Stabilized with Fructose (U.S. Ser. No. 095,181, filed Sept. 11, 1987, Attorney Docket No. 4453) which is incorporated herein by reference.

Method of Preparation

In one method of preparation, a first preblend of all liquid and/or wet ingredients exclusive of the oil is prepared. A second blend of dry ingredients is also prepared. The wet and dry ingredients are combined. For commercial products requiring, e.g., six week stability at refrigerated temperature (40° F.), the mixture is heat treated to provide the requisite microbial stability (100-200 APC). Thereafter, the fish oil is added. Optionally, the product is conventionally homogenized (to a droplet size of 1-7 microns) for phase stability.

In another, preferred method of preparation, the preparation is as described above except that the stabilizing gum is added after the heat treatment along with the fish oil. Further, the homogenization step is practiced so as to obtain a larger than conventionally employed droplet size, namely 8-22 microns with the majority of droplets being 9-13 microns.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food arts, can be undertaken without departing from the spirit and scope of this invention.

EXAMPLE 1

An orange flavored beverage of the present invention was prepared having the following formulation:

| Ingredient | Weight % |
| --- | --- |
| Water | 82.146 |
| High fructose corn syrup (90% fructose dry basis, 20% moisture) | 3.000 |
| Orange juice conc. pulp | 8.500 |
| Citric acid | 0.250 |
| Malic acid | 0.040 |
| Xanthan gum (thickener) | 0.150 |
| Gum blend[1] (thickener) | 0.100 |
| Aspartame | 0.064 |
| Potassium sorbate | 0.100 |
| Fish oil | 4.406 |
| Emulsifiers | 0.200 |
| Oil of orange juice | 0.060 |
| OJ booster flavor | 0.050 |
| Starch | 0.920 |
| Antioxidant blend[2] | 0.014 |
| | 100.000% |

[1] A blend of gums marketed by Kelco Division of Merck & Co., Inc. under the trade name GFS.
[2] Antioxidant blend consisting of 60% tocopherol available from Henkel Corporation under the trade name Covi-OX T70. 30% TBHQ mixture of (32% glycerol monoleate, 30% corn oil, 20% TBHQ, 15% prophylene glycol and 3% citric acid) available from Eastman Chemical Products Inc. under the trade name TENOX 20A. 10% partially hydrogenated soybean oil with BHA to help protect flavor available from Durkee Industrial Foods, under the trade name Durkex 100.

About 4,000 g of beverage was prepared making a pre-blend of all dry ingredients and a second pre-blend of all wet ingredients. Thereafter, the dry pre-blend was admixed with the wet pre-blend in a kitchen blender. To the admixture was added the oil based ingredients. Thereafter, the composition was blended at high speed for 50 seconds to form a stable emulsion. The fructose to fish oil ratio was about 60:100.

Beverages of comparable organoleptic attributes and fish oil stability are obtained when the high fructose corn syrup is replaced with other less pure fructose sources at equivalent fructose levels including 42 D.E. corn syrup.

EXAMPLE 2

An orange flavored beverage of the present invention was prepared according to the procedure of Example 1 having the following formulation:

| Ingredient | Weight % |
| --- | --- |
| Water | 70.788 |
| Orange juice conc., frozen | 9.162 |
| High fructose corn syrup | 11.127 |
| Citric acid | 0.060 |
| Malic acid | 0.060 |
| Maltodextrin #6 | 5.242 |
| Xanthan gum | 0.200 |
| Emulsifier[1] | 0.143 |
| Orange flavor | 0.060 |
| Deodorized fish oil | 3.057 |
| Antioxidant blend | 0.010 |
| (per Example 1) | 100.000% |

[1] A mixture of polysorbate 60 and sorbitan monostearate.

The fructose to fish oil ratio is 327:100 from the high fructose corn syrups alone.

Beverages of comparable organoleptic attributes and fish oil stability are obtained when the orange juice concentrate and orange flavor ingredients are substituted with equivalent levels of juice and concentrated flavors derived from grape, apple, raspberry, blueberry, blackberry, cherry and mixtures thereof.

EXAMPLE 3

An orange flavored beverage emulsion of the present invention was prepared according to the procedure of Example 1 and had the following formulation:

| Ingredient | Weight % |
| --- | --- |
| Water | 72.220 |
| Orange juice conc., frozen | 2.006 |
| High fructose corn syrup | 11.132 |
| Citric acid | 0.060 |
| Malic acid | 0.060 |
| Maltodextrin | 4.784 |
| Xanthan gum | 0.201 |
| Emulsifier | 0.442 |
| Orange flavor | 0.060 |
| Deodorized fish oil | 3.010 |
| Apple juice concentrate | 3.009 |
| Pear juice concentrate | 3.009 |
| Antioxidant blend | 0.010 |
|  | 100.000% |

EXAMPLE 4

In order to prepare a beverage of the present invention, a batch having the following formulation was prepared:

| Ingredient | Weight % |
| --- | --- |
| Water | 61.29 |
| Frozen orange juice concentrate (3:1) | 23.40 |
| High fructose corn syrup | 6.24 |
| Citric acid | 0.50 |
| Malic acid | 0.50 |

| Ingredient | Weight % |
| --- | --- |
| Xanthan gum | 0.10 |
| Maltodextrin bulking agent | 4.77 |
| Fish oil | 3.00 |
| Emulsifiers | 0.14 |
| Orange flavor concentrate | 0.06 |
|  | 100.00 |

A first blend of the wet ingredients excluding the fish oil was made. A second preblend of the dry ingredients except the xanthan gum was prepared. The wet and dry blends were combined. The mix is heated to a temperature of about 175° to 180° for about three minutes. Thereafter, the xanthan and fish oil were added. The mixture was then formed into an emulsion with a droplet size of 8–22 microns. After six weeks of 40° F. storage, the emulsion still held and there is no fishy flavor although a small loss of orange flavor is observed.

What is claimed is:

1. A nutritional beverage containing fish oil yet exhibiting enhanced stability against flavor degradation without heat treating, comprising:
   A. about 10% to 92% by weight of a moisture containing flavor ingredient having a water component and a flavor component;
   B. about 1% to 40% by weight of a deodorized non-hydrogenated fish oil, said fish oil having
      (1) about 150 to 200 ppm of a fish oil stabilizing oil soluble antioxidant selected from the group consisting of TBHQ, BHA, BHT and mixtures thereof;
   C. about 0.5% to 30% by weight of fructose;
   D. sufficient emulsifier to form a stable oil-in-water emulsion; and wherein said beverage is substantially free of fish meat, and wherein the weight ratio of fructose to fish oil is at least 10:100.

2. The beverage of claim 1 wherein the fish oil additionally comprises about 1 to 2000 ppm tocopherol.

3. The beverage of claim 2 wherein the antioxidant is TBHQ.

4. The beverage of claim 3 additionally comprising a citrus oil in a weight ratio to the fish oil of about 1 to 3:100.

5. The beverage of claim 4 wherein the fish oil additionally comprises a chelating agent.

6. The beverage of claim 5 wherein the weight ratio of fructose to fish oil is at least 10:100.

7. The beverage of claim 6 wherein the fructose comprises about 3% to 15% by weight of the beverage.

8. The beverage of claim 7 wherein the weight ratio of fructose to fish oil is at least about 20:100.

9. The beverage of claim 8, additionally comprising:
   E. about 0.1% to 30% by weight of vegetable oil and wherein the combined weight percent of the fish oil and vegetable oil is less than 40% by weight of the beverage and wherein the total oil contains 200 ppm of an antioxidant selected from the group consisting of TBHQ, BHA, BHT and mixtures thereof.

10. The beverage of claim 9, additionally comprising:
    F. about 0.1% to 4% of a stabilizing gum.

11. The beverage of claim 10 wherein the moisture containing flavor ingredient is a fruit juice.

12. The beverage of claim 11 wherein the fish oil additionally comprises about 1 to 150 ppm chelating agent.

* * * * *